United States Patent
Akdim

(10) Patent No.: US 9,751,028 B2
(45) Date of Patent: Sep. 5, 2017

(54) TWO STAGE IN-LINE SEPARATOR

(71) Applicant: FMC Separation Systems, BV, Amsterdam (NL)

(72) Inventor: Mohamed Reda Akdim, Nieuwegen (NL)

(73) Assignee: FMC Separation Systems, BV, Amsterdam (NL)

(*) Notice: Subject to any disclaimer, the term of this patent is extended or adjusted under 35 U.S.C. 154(b) by 320 days.

(21) Appl. No.: 14/436,890

(22) PCT Filed: Oct. 19, 2012

(86) PCT No.: PCT/EP2012/070808
§ 371 (c)(1),
(2) Date: Apr. 18, 2015

(87) PCT Pub. No.: WO2014/060048
PCT Pub. Date: Apr. 24, 2014

(65) Prior Publication Data
US 2015/0283481 A1  Oct. 8, 2015

(51) Int. Cl.
| | |
|---|---|
| *B01D 45/12* | (2006.01) |
| *B01D 19/00* | (2006.01) |
| *B01D 45/16* | (2006.01) |
| *B04C 3/06* | (2006.01) |
| *B04C 3/00* | (2006.01) |

(52) U.S. Cl.
CPC ......... *B01D 19/0057* (2013.01); *B01D 45/12* (2013.01); *B01D 45/16* (2013.01); *B04C 3/00* (2013.01); *B04C 3/06* (2013.01)

(58) Field of Classification Search
CPC ................................ B01D 45/12; B01D 45/16
USPC .......... 55/394, 396, 399, 338, 339, 340, 457
See application file for complete search history.

(56) References Cited

U.S. PATENT DOCUMENTS

| | | | |
|---|---|---|---|
| 4,478,712 A | 10/1984 | Arnaudeau | |
| 6,083,291 A * | 7/2000 | Okada ................... | B01D 45/12 55/337 |
| 2003/0006188 A1 | 1/2003 | Constantine et al. | |

FOREIGN PATENT DOCUMENTS

| | | |
|---|---|---|
| WO | WO 01/00296 A1 | 1/2001 |
| WO | WO 02/056999 A1 | 7/2002 |
| WO | WO 2010/114377 A1 | 10/2010 |

\* cited by examiner

*Primary Examiner* — Robert A Hopkins

(57) ABSTRACT

The present invention regards an inline separator with a first pipe element (10) comprising a rotation-generating element (11) for the fluid flow downstream of an inlet (13) in the first pipe (10), a second pipe element (20) arranged at least partly inside the first pipe element (10), downstream of the rotation-generating element (11) and forming an outlet (25) for lighter density fluids, the first and second pipe elements (10, 20) forming an annular space (27) between an inner surface (15) of the first pipe element (10) and an outer surface (22) of the second pipe element (20), which annular space (27) is connected to a first outlet section (30) for heavier density fluids, wherein the second pipe element (20) is provided with a number of through-going openings (26) over at least a part of its length, the openings (26) leading to a second outlet section (31) for heavier density fluids, and both the first outlet section (30) and the second outlet section (31) are connected to a common container (40) with an outlet (41) for the heavier density fluids. The invention also related to a method for separating a fluid flow.

12 Claims, 2 Drawing Sheets

TWO STAGE IN-LINE SEPARATOR

FIELD OF THE INVENTION

The invention relates to an apparatus and an associated method of separation of a fluid flow. The apparatus and method are particularly suitable for horizontal and vertical in-line separators.

BACKGROUND OF THE INVENTION

In the production of hydrocarbons, particularly from production fields offshore, the produced fluids are often transported in underwater pipelines and risers for long distances. The produced fluids normally comprise oil, gas, water and solids. Dependent on the flow rates of the different fluids, it is an aim to reduce the amount of water and/or separate the fluid into different parts prior to transporting the fluids over longer distances in pipelines. It is known for instance to use a one-stage in-line separator to separate liquids and solids from a gas stream before transporting the gas in a pipeline. One example of such separator is shown in WO02/056999.

The separator in WO02/056999 comprises an essentially tubular casing arranged to constitute a part of the actual pipeline. A spin element for rotation of the fluid flow is located at an upstream end of the casing. The outlet means for the gas comprises an outlet element arranged at the downstream end of the casing and having a central, axially extending passage for the gas, and an outer surface which, together with the inner surface of the casing, forms an annulus for the inflow of liquid. A barrier for the liquid is formed at the downstream end of the casing. The outlet means for the liquid comprises an upwards open container arranged at the downstream end of the casing and adapted to receive liquid which flows into the annulus and partly runs down into the container from the bottom area of the casing at the container opening, and partly falls into the container from the area at said barrier.

However, it has proved that the known solutions do not separate the desired amount of liquid from the gas stream. One possible solution to this is to provide two such separators in series; this is however not so favorable as it requires two control systems and each separator induces pressure losses in the gas stream.

It is therefore an object of the present invention to provide a separator and associated method that reduces or alleviates the problems associated with the known solutions mentioned above.

More specifically, an object of the invention is to provide a separator in which the pressure loss in the fluid flowing through the separator is kept at a minimum at the same time as the desired degree of separation is achieved, resulting in a dryer fluid flow, e.g. gas flow, downstream of the separator.

SUMMARY OF THE INVENTION

The present invention relates to an apparatus providing two-stage separation in the same apparatus, i.e. a separator. The inventive separator is particularly applicable to be used as part of a pipeline, e.g. an in-line separator, where a part of a fluid pipeline is replaced by the inventive separator.

The invention regards an apparatus for separation of a fluid flow. The fluid flow includes at least two fluids of different densities, for instance gas and liquid or possibly gas, liquid and solids. When referring to lighter density fluids, we would normally refer to this as gas, and heavier density fluids would normally be liquids and possibly also solids. Lighter density parts may also contain smaller sized liquid or water droplets and heavier density parts may contain larger sized liquid or water droplets.

The apparatus comprises a first pipe element with a rotation-generating element for the fluid flow downstream of an inlet in the first pipe element, and a second pipe element arranged at least partly inside the first pipe element, downstream of the rotation-generating element and forming an outlet for lighter density fluids. The first and second pipe elements form an annular space between an inner surface of the first pipe element and an outer surface of the second pipe element, which annular space is connected to a first outlet section for heavier density fluids, i.e. liquids or liquids and solids.

According to the invention the second pipe element is provided with a number of through going openings over at least a part of its length. The number of openings lead to a second outlet section for heavier density fluids, i.e. liquids. The second outlet section is separated from the first outlet section, and both the first outlet section and the second outlet section lead to a common container with an outlet for the heavier density fluids. Both the first outlet section and the second outlet section lead to a position in the container which is normally below a liquid level in the container.

A fluid flow flowing into the apparatus is brought into rotation in the apparatus by the rotation-generating element. The fluid particles with heavier densities, i.e. liquid and solids, will tend to separate the outer circumference of the rotational flow. The lighter density fluid particles, i.e. gas, will tend to be separated out in an inner part of the rotational flow.

The rotation-generating element is in one embodiment a stationary element formed with guiding vanes to give the flow a rotational flow pattern downstream of the rotation-generating element. In another embodiment the rotation generating element may be a rotating element.

A major part of the heavier fluids are separated in a first separation stage in the separator by leading the fluids in the outermost part of the rotational flow to a first outlet section. The first outlet section is formed in part by the annular space formed between the first pipe element and the second pipe element. The lighter fluids in the center of the rotational flow pattern flow into the second pipe element arranged coaxially within the first pipe element. The first pipe element has a circular inner cross sectional shape and the second pipe element has at least for a part of its length a circular inner and outer cross sectional shape. This forms a circular annular entry for the heavier density fluids flowing relatively outside the lighter density fluids in the center of the flow. The first outlet section for the heavier densities fluids leads to a container.

The second pipe element, serving as a separation outlet for the lighter density part of the fluids, is arranged at least partly inside the first pipe element. Lighter density parts of the fluids entering the second pipe element will maintain most of the rotational force. In a case with a mist inlet feed to the apparatus, the smaller sized liquid droplets will be removed during the flow through the second pipe element, i.e. the second stage.

Also, in the case of liquid slugs and transients more liquid will be removed in the second stage. The larger sized droplets/particles in the fluid flow, i.e. what is referred to as heavier density part of the fluid flow, will be separated out through the first outlet section, and smaller sized droplets/particles, also referred to as heavier density parts of the fluid flow, will be separated out through the second outlet section, leaving the last part of the fluid flow through the downstream end of the second pipe element being the lighter density parts of the fluid flow. The boundaries of these different parts will depend on the content in the flow at the inlet of the apparatus.

As the lighter density parts of the fluid enter the second pipe element there will be a pressure drop and possibly an increase in velocity, giving the effect that the heavier fluids of the fluids entering the second pipe element will be forced against the inner wall of the second pipe element in the same way as for the rotational flow inside the first pipe element. In order to remove the heavier density fluids from the inside of the second pipe element, the second pipe element is according to the invention provided with a number of through-going openings over at least a part of its length. The part of the second pipe element formed with openings may be located at a distance from the upstream end of the second pipe, this distance being possibly 1-10 diameters of the inner pipe. This second separation of entrained heavier fluids from the lighter density fluids is the second stage of the two-stage separation process. The heavier fluids separated in this second stage are lead to a second outlet section for heavier fluids leading to the same container as the first outlet section.

By having both outlet sections leading to the same container, i.e. a liquid boot, one may have only one system for regulating the separation in the apparatus. This is a benefit compared with having two separators arranged in series with each other.

The common container will under normal operation have liquid in the bottom of the container, and the outlet sections will lead separated liquid to a position below a normal liquid level in the container. This will also result in a difference in the liquid levels in the two outlet sections, as the pressures at the separation stages are different for the two outlet section.

The second pipe element may also be referred to as a vortex finder. According to one aspect the second pipe element has a circular inner cross section and a circular outer cross section for at least an upstream part of the pipe element. According to another aspect the second pipe element has a circular inner and outer cross section for entire length. The second pipe element may be formed with another outer shape in the part of the pipe with the through-going opening.

In an aspect of the invention an anti swirl element may be arranged inside the first pipe element or the second pipe element downstream of the part of the second pipe element with the openings. With the apparatus arranged as a horizontal in-line separator, the downstream end of the second pipe element may lead out to the first pipe element when the first pipe element is continued downstream of the downstream end of the second pipe element. In such an embodiment the anti swirl element may be arranged in the first pipe element. With the apparatus as a vertical in-line separator, the anti swirl element may be positioned at the downstream end of the second pipe element. The anti swirl element serves to bring the flow back to a "normal" flow regime, i.e. to bring the flow out of rotation.

In an aspect of the invention, a mixing element may be arranged upstream of the rotation-generating element in order to the fluid flow prior to bringing it into rotation movement.

The length of the first pipe element downstream of the rotation-generating element and upstream of the second pipe element should be sufficient for the gas and liquid to separate. Typically the length is 3-20 times the inner diameter of the first pipe element. Such a length will give the flow time to stabilize so as to achieve good separation of the fluids with different densities.

A separation apparatus according to the invention is especially suited for a gas continuous flow.

According to another aspect of the invention there may also be arranged a recirculation line for lighter density fluids, i.e. gas, from the container back to the rotation-generation element. An inlet for the recirculation line may be positioned above a liquid level in the container, and the recirculation line may lead to a body of the rotation-generation element. The body may have a central passage and an outlet downstream of the rotation-generation element. A low pressure is created in the center of the flow downstream of the rotation-generation element, thereby producing a suction in the recirculation line, ensuring trapped gas in the separated liquid is guided back into the main flow. This would in one embodiment be the gas trapped in the liquid in the first outlet section.

According to an aspect of the invention the first pipe element may have a size similar to piping leading to the inlet of the apparatus. The inlet of the apparatus would in this aspect be formed by one end of the first pipe. The outlet for the lighter fluids, i.e. the gas, would in one embodiment be formed by the other end of the first pipe element and in another embodiment by the second pipe element. Such a solution would normally be referred to as an inline apparatus.

According to an aspect of the invention the apparatus may be arranged with a longitudinal axis of the first and second pipe elements in a horizontal direction. Such an embodiment may be referred to as a horizontal separator, and possibly an in-line horizontal separator. According to another aspect the apparatus may be arranged with a longitudinal axis of the first pipe element and at least a part of the second pipe element extending in a vertical direction. This would be referred to as a vertical separator, and possibly an in-line vertical separator. At least for a part of its length the second pipe element may be substantially coaxially arranged inside the first pipe element.

According to one aspect, the first outlet section and the second outlet section may in part be formed by the first and second pipe elements and are separated by a divider plate extending into the container to a position below a normal liquid level in the container.

The first outlet section would in one embodiment where the separator is arranged as a horizontal separator, be formed by the annular space being closed off at one end by the divider plate and continued out of the first pipe element through a connection piece down into the container. The divider plate would then comprise a first part which encircles the second pipe element and extends between the second pipe element and the first pipe element, forming a barrier for separated fluids flowing in the annular region. The divider plate may also comprise a second part which extends from the annular space, through the connection piece and into the container to a position below a normal liquid level in the container, thereby forming part of the boundary of the first outlet section. The second part would be a continuation of the first part. This divider plate may in one configuration be formed in one plane.

In addition, there may be an end plate extending from the downstream end of the second pipe element and through the annular space to the inner surface of the first pipe element. The end plate will then form a barrier in the annular space. The second outlet section is then formed by the first pipe element, the second pipe element, the part with the openings, the divider plate and the end plate and is then continued through the connection piece and down into the container. The second outlet section will then be on the other side of the divider plate compared with the first outlet section as it extends through the connection piece and down into the container. The divider plate may be positioned centrally within the connection piece and the container or it may be positioned off-center through the connection piece. The positioning of the divider plate will depend on the flow content in the flow through the apparatus.

In a vertical version of the separator, there is positioned a divider plate which in a first part extends for a distance from the second pipe element and into the annular space, and thereafter in a second part extends in parallel with the first pipe element. The first part of the divider plate is positioned upstream of the through-going openings in the second pipe element. This divider plate will separate the annular space into a first outlet section at the outside of the divider plate and a second outlet section at the inside of the divider plate. The divider plate will as it extends in parallel with the first pipe element form a cylinder. The cylinder-formed divider plate will extend through the connection piece and into the container. The second pipe element will form a bend and extend out through the divider plate and the first pipe element.

In another embodiment the annular space may be closed off at one end by a first part of a divider plate, and an outlet may be formed from this annular space leading to a pipe extending into the container to a position below a normal liquid level in the container. The second outlet section may be formed by another pipe element connected to the openings in the second pipe element. This pipe will also extend down into the container to a position below a normal liquid level. Thereby the second outlet section may be formed without an annular space around the second pipe element.

The second pipe element is in a part formed with a number of through-going openings. These openings may according to one aspect be arranged at least partly around the circumference of the second pipe element. In a horizontal version of the separator these holes will be positioned in a relative lower part of the second pipe element, possibly the lower half of the second pipe element or lower third of the second pipe element. In a vertical version of the separator the through-going holes may be arranged around the whole circumference of the second pipe element. The holes may be evenly distributed in the part where they are present or they may be grouped.

According to another aspect of the invention the openings are made with a center axis of the opening at an angle relative a radial axis of the second pipe element. A radial axis is an axis transverse to a longitudinal axis of the second pipe element. Such an orientation of the openings will form an edge in the material of the pipe element at one side of the opening. The angle may be relative to a transverse plane, or in a transverse plane relative to the longitudinal axis of the second pipe element, or a combination of these. Another possibility is to form the opening with a sidewall which in part is angled relative the rest of the sidewall.

According to another aspect the openings may be formed as slots. The openings would in this embodiment have an extension which is longer in one direction compared with another direction, giving them a length and a width. In another embodiment they may be elliptic or circular. According to another aspect the number of slots may be arranged with their length parallel to a longitudinal axis of the second pipe element. Alternatively, they may be arranged with their length at an angle relative the longitudinal axis or with the length following a spiral curve. The second pipe element may also be formed with a combination of different kinds of openings leading to the second outlet section.

According to the invention there is also provided a method of separating a multi phase fluid flow in a pipe, comprising the steps of:
bringing the fluid flow into rotation by means of a rotation-generating element, the rotation-generating element being arranged downstream of an inlet in a first pipe element,
allowing the heavier density fluids to separate from the lighter density fluids of the fluid flow for a predetermined distance in a first separation stage,
leading the separated lighter density fluids through a second pipe element, the second pipe element extends extending at least partly inside the first pipe element,
separating the heavier density fluids of the fluid flow in a first outlet section of an outlet,
separating entrained heavier density fluids from the separated lighter density fluids through a number of slots in the second pipe element, and leading the entrained heavier density fluids to a second outlet section of the outlet.

According to an aspect of the invention the method it comprises leading both outlet sections into a common container for the heavier density fluids, i.e. the liquids with possible particles.

BRIEF DESCRIPTION OF THE DRAWINGS

These and other characteristics of the invention will be explained in more detail in the following description of two embodiments, which are given as a non-restrictive examples, with reference to the attached drawings wherein.

DETAILED DESCRIPTION OF THE INVENTION

Figure 1:
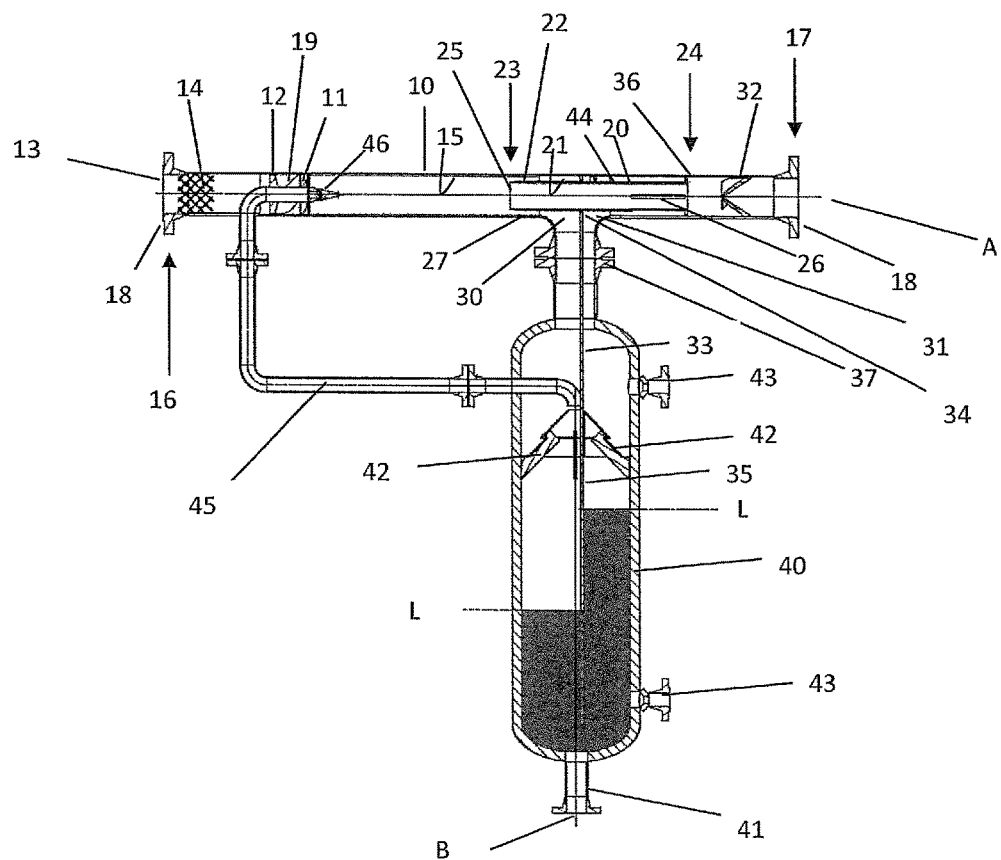
FIG. 1 shows a cross section through a first embodiment of the invention.
Figures 1A, 1B:
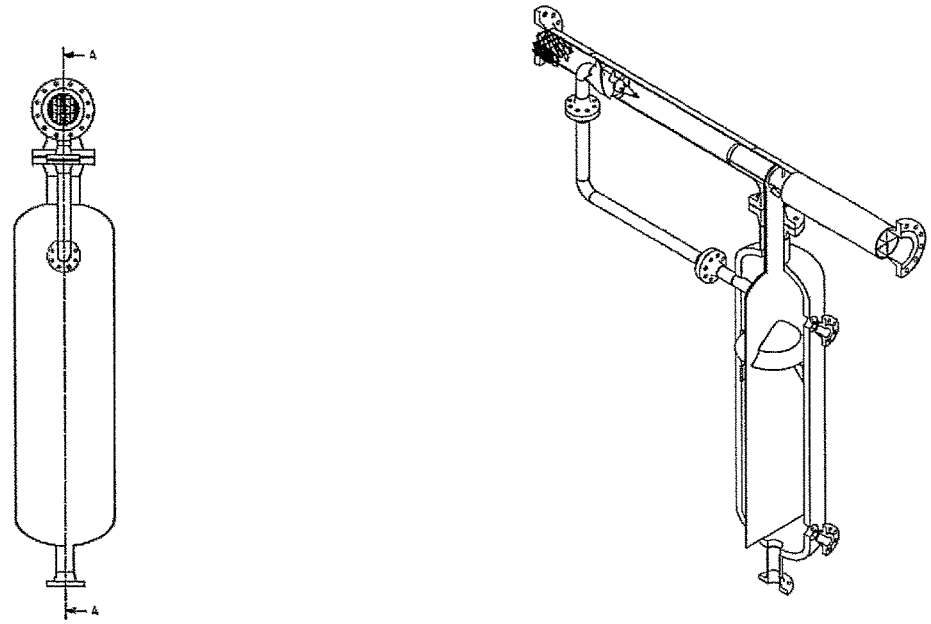
FIG. 1A shows the first embodiment as seen from outside from an upstream side.
FIG. 1B shows the first embodiment in an elevated view, where parts of the outer elements are removed.

A first embodiment of the invention, in which the apparatus is arranged as a horizontal in-line separator, is shown in FIG. 1. FIGS. 1A and 1B show the same embodiment in different views. The apparatus comprises a first pipe element 10. This pipe element 10 has an upstream end 16 and a downstream end 17 with connection means 18 for connection to a pipeline. The first pipe element is a pipe having a circular cross section with a smooth inner surface 15. The upstream end 16 forms the inlet 13 for the separation apparatus. Downstream of the inlet 13 may be a mixer 14. Downstream of the mixer 14 and the inlet 13 there is arranged a rotation-generation element 11. In this embodiment this is a fixed element with guiding vanes 12 around a body 19 for guiding the fluid flow into rotation or swirl. Downstream of this rotation-generation element 11 the flow will have a rotation and the heavier parts of the fluid flow, or the parts with a higher density, will tend to flow in a part of the pipe close to the inner surface 15 of the first pipe element 10 while the lighter parts, or the parts with a smaller density, will tend to flow closer to a longitudinal axis of the first pipe element.

A second pipe element 20 is positioned downstream of the rotation-generation element 11. This second pipe element 20 is positioned coaxially within the first pipe element 10. The upstream end 23 of the second pipe element 20 forms an outlet 25 for lighter density fluids, i.e. gas, from the first pipe element 10, since it encircles the inner part of the flow within the first pipe element 10. Between an outer surface 22 of the second pipe element 20 and the inner surface 15 of the first pipe element 10 is formed an annular space 27. This annular space 27 forms part of a first outlet section 30 for heavier parts of the fluid flow, since this heavier part of the fluid flow is flowing in an outer part of the first pipe element 10, close to an inner surface 15 of the first pipe element 10. The annular space 27 is closed by a first part 34 of a divider element 33. The annular space 27 leads through a connection piece 37 to a container 40 for the heavier parts of the fluid flow, i.e. the liquid part. The heavier parts of the fluid flow entering the annular space 27 forming the first outlet section 30 will flow down into this container 40, which is normally referred to as a liquid boot.

The container 40 has an outlet 41 for the liquid, or the heavier part of the fluid flow. Level measuring indication means 43 are also provided to regulate the liquid level in the container. Momentum breakers 42 may also be positioned in the passage down into the container 40 to prevent splashing in the container 40. From the container 40 there is also provided a recycle line 45 for recycling gas or lighter density parts of the fluid flow back into the first pipe element 10. The recycle line 45 leads from an upper part of the container 40 positioned above a liquid level to, in this embodiment, the body 19 of the rotation generation element 11. The body 19 has a central passage and holes 46 at a downstream end of the body 19. The holes 46 are configured such that the gas has a mainly radial flow direction when it leaves the body 19. A suction pressure within the rotational flow downstream of the rotation generation element 11 creates a flow of gas from the container 40 to the first pipe element 10. It is possible to envisage other possible configuration of the recycle line, for instance as a line positioned outside of the body and ending at the downstream end of the body.

According to the invention the second pipe element 20 comprises at a distance from the upstream end 23 of the second pipe element 20 a part with at least one opening or slot 26 through the wall of the second pipe element 20. As the fluid enters the second pipe element 20 it is still in rotation, and heavier parts of the flow, or with other words liquid, entering the second pipe element will be pushed towards the inner surface 21 of the second pipe element 20. As it enters the part of the second pipe element with the slots 26, this liquid will leave the second pipe element 20 through the slots 26. The slots lead to a second outlet section 31. In this embodiment the second outlet section 31 is formed by a second part of the annular space 27 between the second pipe element 20 and the first pipe element 10. This second outlet section 31 is separated from the first outlet section 30 by the divider plate 33. At the other end of the annular space 27 there is arranged an end plate 36 between the downstream end of the second pipe element 20 and the first pipe element 10. The first part 34 of the divider plate is positioned in the annular space and a second part 35 of the divider plate 33 extends through the connection piece 37 and down into the container 40 to a position which is below a possible normal liquid level in the container. Liquid in the container will therefore act as liquid lock between the two outlet sections.

The connection piece 37 is therefore divided into two separate flow paths from the first pipe element 10 into the container 40 to thereby form the first and second outlet sections 30, 31. There may in the second outlet section 31 be arranged momentum breakers 42 to prevent splashing in the container. Since the two outlet sections 30, 31 are separated by the dividing plate and there is a liquid lock in the bottom part of the container, there will be different liquid levels in the two parts of the container 40. Entrapped gas with the liquid leaving the first pipe element through the first outlet section 30 will be re-circulated back into the first pipe element through the recirculation line 45. Entrapped gas with the liquid leaving the pipe element through the second outlet section 31 will migrate back through the slots 26 in the second pipe element. An anti swirl element 32 may be arranged downstream of the downstream end 24 of the second pipe element 20 to give the gas flow an axial flow at the outlet of the downstream end 17 of the first pipe element 10. This may be omitted, or it may be arranged in the second pipe element 20 if the second pipe element is extended to the downstream end of the apparatus. The container 40 may be hemispherical, elliptical of conical in its bottom part. A vortex breaker may also be positioned in the outlet from the container 40.

Figure 2:
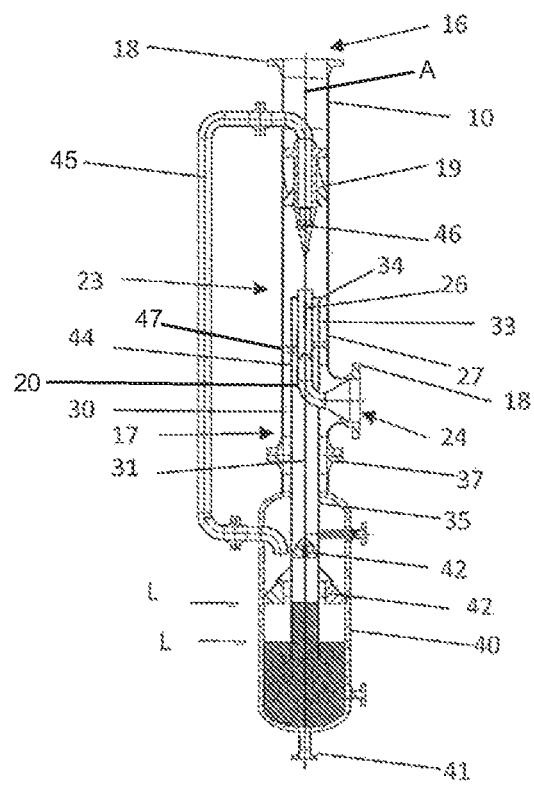
FIG. 2 shows a second embodiment of the invention.
Figure 2A:
FIG. 2A shows the second embodiment as seen from outside from an upstream side.
Figure 2B:
FIG. 2B shows the second embodiment in an elevated view, where parts of the outer elements are removed.

A second embodiment of the invention is shown in FIGS. 2, 2A and 2B. In these figures the apparatus according to the invention is presented as a vertical inline separator. Similar elements to the first embodiment are given the same reference numerals, and reference may be made to the description of the first embodiment for these elements. Primarily only the differences between the second embodiment and the first embodiment will be described hereafter.

In the second embodiment the first pipe element 10 has a longitudinal axis A extending in a mainly vertical direction. A first part of the second pipe element 20 is arranged with a longitudinal axis coaxial with the first pipe element 10. This first part of the second pipe element comprises the upstream end 23 and the part with the slots 26. Further downstream the second pipe element 20 is turned to a direction transverse to the longitudinal axis of the first pipe element 10 and then forms an outlet at its downstream end 24 for the lighter density part, i.e. gas, of the fluid flow. An anti swirl element 47 is arranged upstream of the turning of, or the bend in, the second pipe element 20. This anti swirl element 47 may also be positioned after the turning of the second pipe element, or it be omitted. The divider plate or divider element 33 in the first embodiment is in the form of a plate with an orientation mainly transverse to the longitudinal axis A of the first and second pipe elements 10, 20. In this second embodiment the divider plate 33 has a different shape, but has the same functionality as in the first embodiment. The divider plate 33 in this second embodiment has a first part 34 which extends in a radial direction for a distance from the outer surface 22 of the second pipe element 20 and into the annular space 27 between the first pipe element 10 and the second pipe element 20. The first part 34 thus forms a disk-like part. The divider plate 33 has a second part 35 which extends from the first part in a direction parallel to the longitudinal axis A of the first pipe element 10, as a pipe or cylinder-shaped part. The second part 35 extends through a connection piece 37 and down into the container 40 to a level below a normal liquid level L in the container. Thereby the fluid will create a liquid lock in the container 40.

In this embodiment a mixer may be positioned at the inlet, even if this is not shown in the drawings. In the first and second outlet sections 30, 31 of both embodiments there also be arranged anti swirl strips 44 to stop the swirling of the fluid flow after it has been separated from the lighter density fluid flow, i.e. the gas.

The invention has now been explained with reference to two non-limiting embodiments. A skilled person would understand that alterations and modifications may be made to the embodiments that are within the scope of the invention as defined in the claims. It should also be mentioned that several of these devices according to the invention may be placed in series if severe liquid slugs or transient in the fluid flow are expected.

The invention claimed is:

1. An apparatus for separation of a fluid flow, the fluid flow including at least two fluids of different densities, the apparatus comprising:
    a first pipe element comprising an inlet for the fluid flow and a rotation-generating element positioned downstream of the inlet;
    a second pipe element arranged at least partly inside the first pipe element downstream of the rotation-generating element, the second pipe element forming an outlet for lighter density fluids;
    the first and second pipe elements forming an annular space between an inner surface of the first pipe element and an outer surface of the second pipe element, which annular space is connected to a first outlet section for heavier density fluids;
    wherein the second pipe element is provided with a number of through-going openings over at least a part of its length, the openings extending through a wall of the second pipe element and leading to a second outlet section for heavier density fluids; and
    wherein both the first outlet section and the second outlet section are connected to a common container having an outlet for the heavier density fluids.

2. The apparatus according to claim 1, wherein the first outlet section and the second outlet section are in part formed by the first and second pipe elements and are separated by a divider plate extending into the container to a position below a normal liquid level in the container.

3. The apparatus according to claim 1, wherein the apparatus is arranged with a longitudinal axis of the first and second pipe elements in a horizontal direction.

4. The apparatus according to claim 1, wherein the apparatus is arranged with a longitudinal axis of the first pipe element and at least a part of the second pipe extending in a vertical direction.

5. The apparatus according to claim 2, wherein the divider plate comprises a first part which encircles the second pipe element and extends between the second pipe element and the first pipe element to thereby form a barrier for separated fluids flowing in the annular region.

6. The apparatus according to claim 5, wherein the divider plate comprises a second part as a continuation of the first part, which second part extends from the annular space and into the container to a position below a normal liquid level in the container to thereby form a barrier between the first and second outlet sections.

7. The apparatus according to claim 1, wherein the second pipe element is at least for a part of its length substantially coaxially arranged inside the first pipe element.

8. The apparatus according to claim 1, wherein the through-going openings are arranged at least partly around the circumference of the second pipe element.

9. The apparatus according to claim 1, wherein openings each comprise a center axis which is oriented at an angle relative a radius of the second pipe element.

10. The apparatus according to claim 1, wherein the openings are formed as slots.

11. The apparatus according to claim 10, wherein the slots are arranged with their length parallel to a longitudinal axis of the second pipe element.

12. A method of separating a multiphase fluid flow in a pipe, the method comprising the steps of:
    directing the fluid flow through an inlet in a first pipe element;
    bringing the fluid flow into rotation by means of a rotation-generating element arranged upstream downstream of the inlet,
    allowing the heavier density fluids to separate from the lighter density fluids of the fluid flow for a predetermined distance in a first separation stage,
    leading the separated lighter density fluids through a second pipe element, the second pipe element extending at least partly inside the first pipe element,
    separating the heavier density fluids of the fluid flow into a first outlet section of an outlet,
    separating entrained heavier density fluids from the separated lighter density fluids through a number of slots in the second pipe element, the slots extending through a wall of the second element, and leading the entrained heavier density fluids to a second outlet section of the outlet.

* * * * *